May 17, 1927. 1,629,180
H. J. SMITH
SPEED CHANGER
Filed Aug. 12, 1924   3 Sheets-Sheet 3

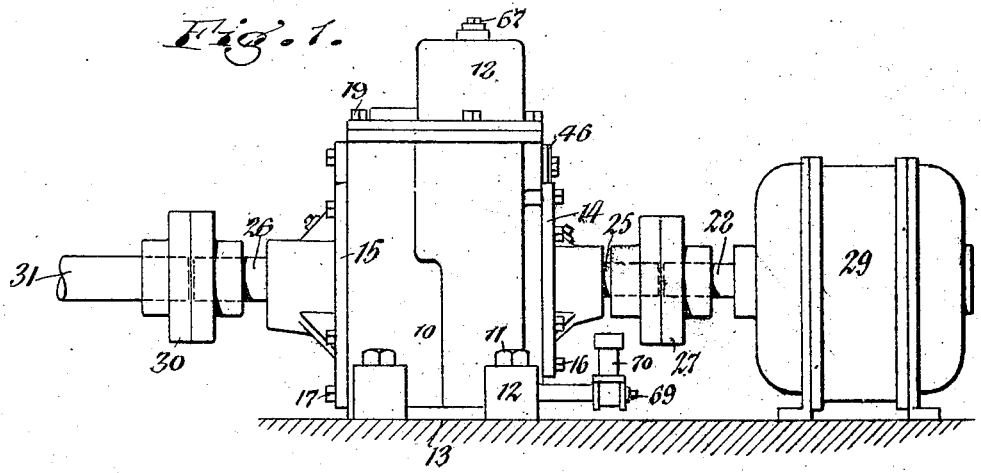
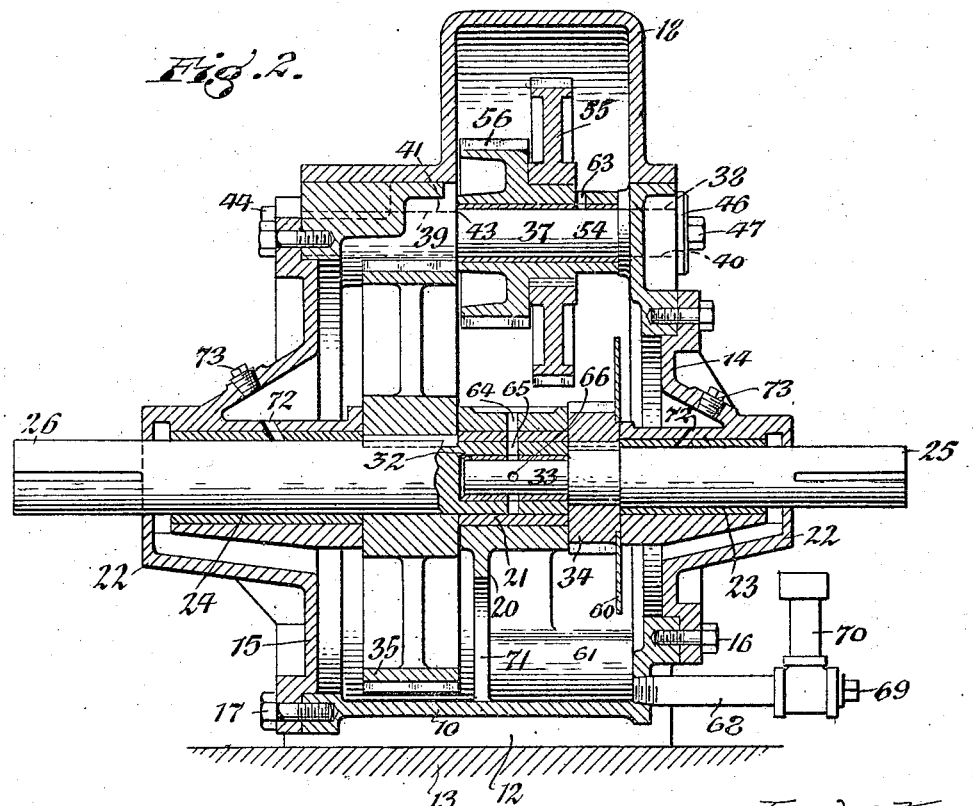

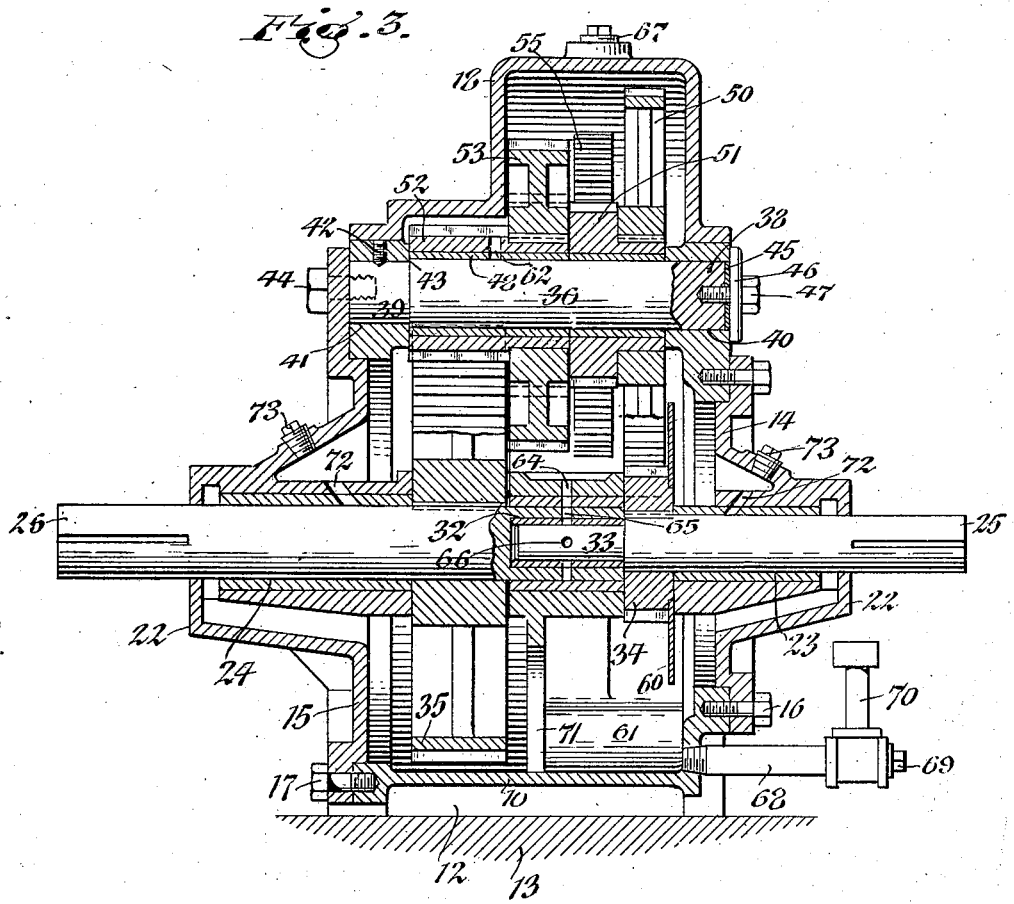

Patented May 17, 1927.

1,629,180

UNITED STATES PATENT OFFICE.

HARRY J. SMITH, OF LAKEWOOD, OHIO.

SPEED CHANGER.

Application filed August 12, 1924. Serial No. 731,572.

This invention relates to a speed changer which is primarily intended for reducing speed but which may also be employed for increasing the speed of the driven member as compared with the speed of the driving member.

As is well known speed changers are usually placed between a prime mover and the machine to be operated, or between adjacent ends of two shafts which are to be rotated differentially without the use of counter shafts as well as avoiding encroachment of valuable space needed for other purposes.

It is the object of this invention to produce a speed changer of this character which is not only simple, durable and compact in construction, but which also operates smoothly, quietly and safely due to its working parts being completely enclosed and thoroughly lubricated, which is of symmetrical design so as to adapt itself readily to most any location, and which can be readily assembled and dismembered either wholly or in part for convenience in inspection, adjustment or repairs.

In the accompanying drawings:

Figure 1 is a side elevation of a speed changer embodying my invention and coupled with an electric motor.

Figures 2 and 3 are vertical longitudinal sections taken on the correspondingly numbered lines in Figure 5.

Similar characters of reference indicate corresponding parts throughout the several lines of the drawings.

Figure 4:
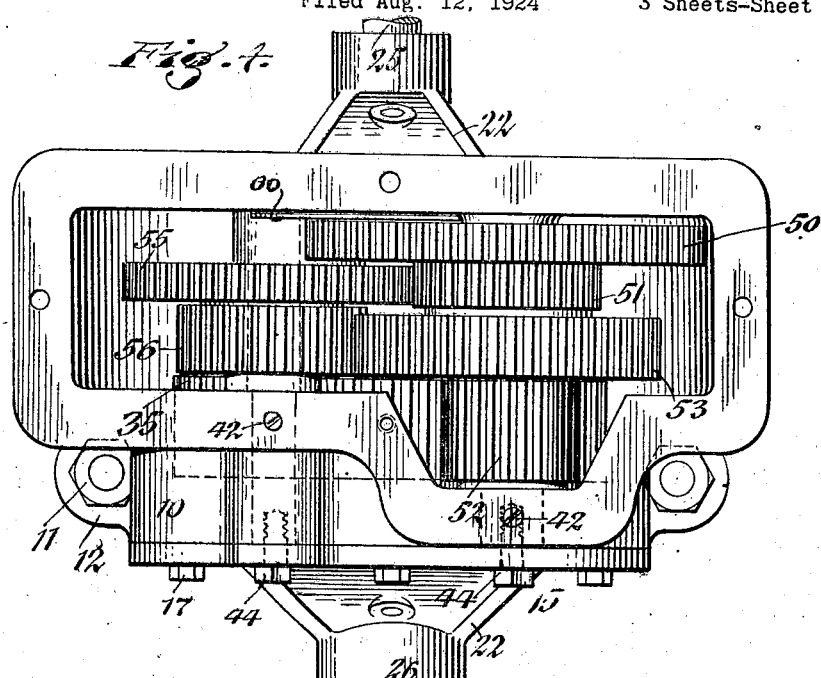
Figure 4 is a top plan view of the speed changer with the cover, top or cap removed.
Figure 5:
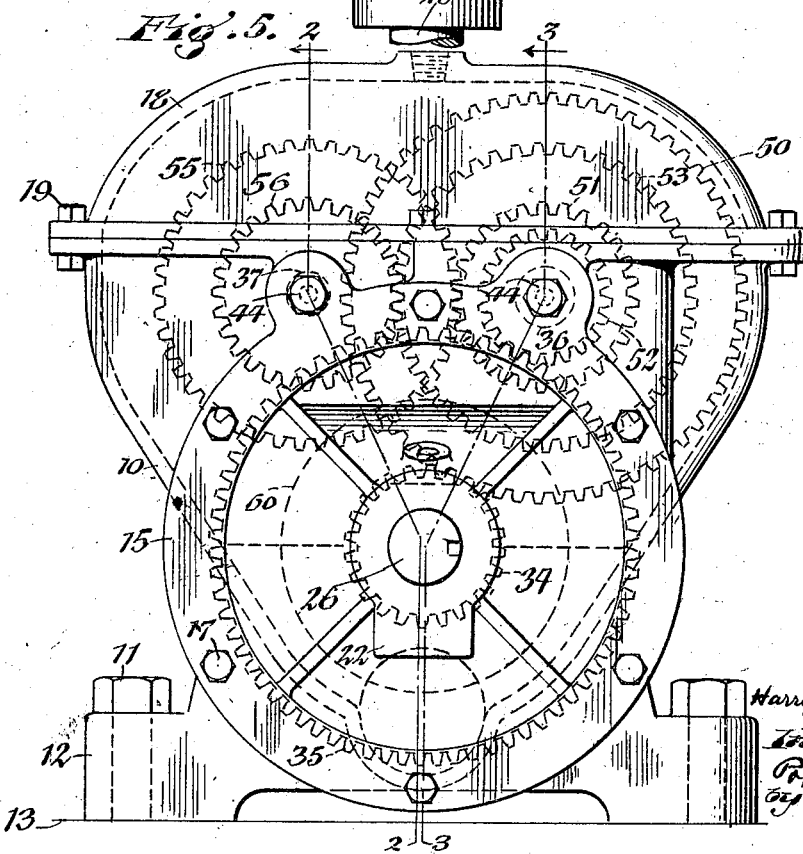
Figure 5 is an end elevation of the speed changer containing my invention and viewed from the low speed end of the same.

The working parts of this speed changer are mounted on a housing or frame which comprises a central hollow section or body 10 which is open at its opposite ends and at its top and is adapted to be secured to a support in any suitable manner, for example, by bolts 11 passing through lugs 12 on the lower or base part of the body and entering a foundation or floor 13, or the like, as shown in Figures 1, 2, 3 and 5. The opposite ends of the body are normally closed by housing heads 14, 15 which are detachably connected with the body by bolts or screws 16, 17, and the top of the body is normally closed by a housing cap 18 detachably secured thereto by screws or bolts 19.

Arranged within the lower central part of the body of the housing is a bracket 20 which projects upwardly from the bottom thereof and is provided at its upper end about midway of the heighth of the body with a horizontal longitudinal central bearing 21. The housing heads are provided with lateral extensions 22 which carry horizontal longitudinal end bearings 23, 24 arranged axially in line with the central bearing 21, each of said end bearings being arranged principally outside of the joint between the respective head and the body and projecting with its inner end slightly inward beyond this joint so as to leave the space within the housing sufficiently clear to receive the change speed gearing.

In the bearings 23 and 24, are journalled the high and low speed shafts 25, 26 respectively which are arranged axially in line and one of which is adapted to be connected at its outer end with a driving member and the other with a driven member depending on whether the speed is to be reduced or increased by the interposition of the speed changer. In the present instance it is assumed that the speed is to be reduced and for that purpose as shown in Figure 1, the high speed shaft 25 is connected by a coupling 27 with the driving shaft 28 of an electric motor 29, and the low speed shaft 26 is connected by a coupling 30 with a driven shaft 31 from which power may be delivered to the parts to be actuated in any suitable or approved manner. The opposing inner ends of the high and low speed shafts are both rotatably mounted in the central bearing 21 so that they are maintained in axial alignment but are capable of turning one faster than the other; but in the present instance in the same direction. This is preferably accomplished, as shown in Figures 2 and 3, by journalling the inner end of the low speed shaft in the central bearing 21 and providing the same with an axial bearing bore 32 which receives a reduced spindle 33 on the inner end of the high speed shaft.

The high speed shaft is provided between its inner and outer bearings with a small high speed gear wheel or pinion 34 and the low speed shaft is provided between its outer and inner bearings with a large low speed gear wheel 35.

Above the high and low speed shafts are arranged two intermediate horizontal longitudinal shafts 36, 37, which are parallel with each other and the high and low speed shafts. Each of these intermediate shafts has its cylindrical ends, 38, 39, arranged in cylindrical seats, openings or bearings 40, 41, formed in the upper parts of the end heads of the housing and the same is held against rotation by a holding device which in the present instance consists of a set screw 42 arranged in a threaded opening in the adjacent bearing 41 and engaging the adjacent end 39 of the respective intermediate shaft, as shown in Figure 3. This last mentioned end of each intermediate shaft is preferably reduced to form an outwardly facing shoulder 43 thereon and this is drawn tightly against the inner side of the adjacent bearing 41 by a horizontal draw screw 44 passing through an opening in the adjacent low speed head 15 and a threaded longitudinal opening in the reduced end of the intermediate shaft, thereby forming a leaktight joint between this end of said shaft and the housing.

In order to form a leaktight joint between the other end 38 and the bearing 40 a packing 45 is arranged in the outer end of this bearing between the end of the respective intermediate shaft and a washer 46 which extends across the outer end of this bearing and is held thereagainst by a fastening screw 47 which passes through this washer and enters a threaded longitudinal opening in the adjacent end of this intermediate shaft, as shown in Figure 3.

On the intermediate shaft 36 are mounted two pairs of intermediate gear wheels, the members of one pair being connected with each other and rotating about a sleeve 48 on this shaft and consisting of a large gear wheel 50 meshing with the high speed driving gear wheel 34 arranged next to the housing and a small gear wheel 51 arranged on the inner side of the large gear wheel 50, and the other pair also rotating about the sleeve 48 and consisting of an outer small gear wheel 52 arranged next to the housing and meshing with the low speed driven gear wheel 35 and a large inner gear wheel 53 arranged next to the gear wheel 51.

On the other intermediate shaft 37, is mounted one pair of intermediate connected gear wheels which rotate about a sleeve 54 on this shaft, and consist of a large gear wheel 55 which meshes with the small gear wheel 51 on the other intermediate shaft and a small gear wheel 56 meshing with the large gear wheel 53 on the other intermediate shaft.

Upon applying power to the high speed shaft the same is transmitted successively through the gear wheels 34, 50, 51, 55, 56, 53, 52, and 35 to the low speed shaft whereby the latter is rotated at a comparatively slow speed as compared with the speed of the high speed shaft. Instead of reducing the transmission of speed the same may be increased in the same measure by connecting the driving member with the low speed shaft and the driven member with the high speed shaft thereby reversing the course of the power through the train of gearing and stepping up the speed instead of down.

If it is desired to vary the relative speed of the driving and driven shafts this can be done by removing the cap of the housing, sliding out the intermediate shafts 36, 37 and replacing the several pairs of gear wheels therein by a set having the proper relative dimensions to give the desired variation in speed. It is possible to thus change the intermediate gearing without dismounting the rest of the housing and gearing or disturbing the connection between the high and low speed shafts and the parts with which they co-operate.

The housing which encloses the gearing is made tight so that the same is practically noiseless and the same may also be lubricated by means of an oil disk 60 secured to the high speed shaft adjacent to the inner end of its bearing 22 and adapted to pick up oil from the reservoir 61 formed by the lower part of the housing and splash or throw the same upwardly against the gearing in the upper part of the housing. This oil may be conducted to the intermediate shaft 36 through an oil hole 62 formed in the bushing 48 and gear wheel 52, and to the intermediate shaft 37 through an oil hole 63 formed in the bushing 54 and the gear wheel 56. The opposing ends of the high and low speed shafts are lubricated on each other and in the central bearing by an oil hole 64 in the central bearing arranged in line with transverse oil holes 65, 66 in the inner ends of the low and high speed shafts, as shown in Figures 2 and 3. Oil is supplied to the interior of the housing through an opening in the top of the cap which is normally closed by a plug 67 and the oil may be drained from the lower end of the housing when desired through a drain pipe 68 connected at its inner end with the housing and provided at its outer end with a removable plug 69. This drain pipe is provided with a stand pipe 70 to which may be connected a gage for observing the height of the oil in the housing. The lower part of the central bracket 20 is provided with a passage 71 to permit the oil to flow to the spreading disk and the drain pipe.

The outer bearings of the high and low speed shafts are additionally lubricated through oil holes 72 in these bearings within the housing which holes are accessible through holes in the tops of the extensions 22 which are normally closed by plugs 73.

This speed changer or transformer employs two intermediate shafts which are parallel with the high and low speed shafts and equidistant relative thereto. By this means the speed which is transmitted from the high speed shaft to the low speed shaft and vice versa, may be varied by interchanging the gears and varying the number of the same to suit different requirements and still employ the same frame or housing and shafting. As shown in the drawings eight gears are employed which is suitable for a certain class of work. If the speed change is to be effected by fewer steps this could be effected by omitting the gears 55 and 56 on the intermediate shaft 37 and using a pair of gears similar to 50 and 51 on the shaft 36 of which the larger would mesh with the high speed gear wheel 34 and the smaller would mesh with the low speed gear wheel 35, thereby employing only four gear wheels in effecting this change of speed.

Similarly only one pair of large and small gears need be mounted on each intermediate shaft if a further change of speed involving only six gear wheels is required. In such a case the small gear on one intermediate shaft would mesh with the large gear on the other intermediate shaft, and the large gear on one intermediate shaft would mesh with the small high speed gear wheel and the small gear on the other intermediate shaft would mesh with the large low speed gear wheel.

Additional changes in speed involving the use of two gears for each step in the change can be effected in like manner by crossing back and forth between the intermediate shafts without dismantling or disturbing the main shafts consisting of the high and low speed shafts.

In this speed changer the use of overhung and internal gear wheels is avoided and all the bearings have adequate contact surfaces, thus providing a very sturdy and durable structure which is capable of taking the heaviest loads intended to be imposed on the same without wearing unduly or straining any of the parts.

Moreover this speed changer is completely inclosed rendering the same perfectly safe without using guards of any kind, and owing to its low height from the base line to the center of the main shafts the same is capable of universal installation.

I claim as my invention:

1. A speed changer comprising a small high speed gear wheel, a large low speed gear wheel, a double pair of gear wheels each pair being connected and consisting of a small gear wheel and a large gear wheel, the large gear wheel of one pair meshing with the small high speed gear wheel and the small gear wheel of the other pair meshing with the large low speed gear wheel, and a single connected pair of small and large gear wheels, the large gear wheel of the single pair meshing with the small gear wheel of the pair geared with the high speed gear wheel, and the small gear wheel of said single pair meshing with the large gear wheel of the pair geared with the slow speed gear wheel, said small high speed gear wheel and large low speed gear wheel being on one axis, said double pair of gear wheels being on another axis, and said single pair of gear wheels being on still another axis and the axes of said high and low speed shafts and the intermediate shafts being parallel and equidistant.

2. A speed changer comprising a frame, a high speed shaft journaled on said frame, a low speed shaft journaled on said frame in line with the high speed shaft, and two intermediate shafts mounted on said frame parallel with each other and with said high and low speed shafts, the axes of said intermediate shafts being arranged equidistant to the axes of said high and low speed shafts, and said shafts being adapted to receive interchangeable intermeshing gearing for varying the relative speed of the high and low speed shafts.

3. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft, and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the slow speed shaft, said housing having a single internal bracket in which the inner ends of the high and low speed shafts are rotatably mounted in axial alignment with each other the axes of said high and low speed shafts and the intermediate shafts being parallel and equidistant.

4. A speed changer comprising a housing, a high speed shaft journalled in said housing, a low speed shaft jorunalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the other pair geared to the slow speed shaft, said housing comprising a central hollow body and heads connected with opposite ends of said body, and said body being provided with an internal bracket on which the opposing ends of the high and low speed shafts are rotatably mounted in axial alignment the axes of said high and low speed shafts and the intermediate shafts being parallel and equidistant.

5. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft, and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the other pair geared to the slow speed shaft, said housing comprising a central hollow body and heads connected with opposite ends of said body, and said body being provided with an internal bracket on which the opposing ends of the high and low speed shafts are rotatably mounted in axial alignment, and the end heads being provided with bearings in which said high and low speed shafts are respectively journalled.

6. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft, and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the other pair geared to the slow speed shaft, said housing comprising a central hollow body and heads connected with opposite ends of said body, and said body being provided with an internal bracket on which the opposing ends of the high and low speed shafts are rotatably mounted in axial alignment and the end heads being provided with bearings in which said high and low speed shafts are respectively journalled and said body having seats in which said intermediate shafts are non-rotatably mounted.

7. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft, and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the slow speed shaft, said housing comprising a central hollow body and heads connected with opposite ends of said body, and said body being provided with an internal bracket on which the opposing ends of the high and low speed shafts are rotatably mounted in axial alignment, and the end heads being provided with bearings in which said high and low speed shafts are respectively journalled, said body having circular seats in which the ends of said intermediate shafts are non-rotatably mounted and each of said intermediate shafts having a shoulder engaging with the inner end of one of its seats.

8. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the low speed shaft, said housing comprising a central hollow body and heads connected with opposite ends of said body, and said body being provided with an internal bracket on which the opposing ends of the high and low speed shafts are rotatably mounted in axial alignment and the end heads being provided with bearings in which said high and low speed shafts are respectively journalled, said body being provided at its ends with circular seats, and each of said intermediate shafts having one end of large circular form and engaging a seat on one end of the body, while its other end is of reduced circular form and engages with the companion seat at the opposite end of the body and forms an outwardly facing shoulder engaging the inner side of the last mentioned seat.

9. A speed changer comprising a housing, a high speed shaft journaled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the slow speed shaft, said housing comprising a central hollow body and heads connected with opposite ends of said body, and said body being provided with an internal bracket on which the opposing ends of the high and low speed shafts are rotatably mounted in axial alignment and the end heads being provided with bearings in which said high and low speed shafts are respectively journalled said body being provided at its ends with circular seats, and each of said intermediate shafts having one end of large circular form and engaging a seat on one end of the body, while its other end is of reduced circular form and engages with the companion seat at the opposite end of the body and forms an outwardly facing shoulder engaging the inner side of the last mentioned seat and means for holding each intermediate shaft in place.

10. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the low speed shaft, said housing comprising a central hollow body and heads connected with opposite ends of said body, and said body being provided with an internal bracket on which the opposing ends of the high and low speed shafts are rotatably mounted in axial alignment and the end heads being provided with bearings in which said high and low speed shafts are respectively journalled, said body being provided at its ends with circular seats, and each of said intermediate shafts having one end of large circular form and engaging a seat on one end of the body, while its other end is of reduced circular form and engages with the companion seat at the opposite end of the body and forms an outwardly facing shoulder engaging the inner side of the last mentioned seat and means for holding each intermediate shaft in place, comprising a set screw arranged on the body and engaging with the side of said intermediate shaft, and a draw screw arranged on one of the housings heads and engaging endwise with the reduced end of the respective intermediate shaft.

11. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the low speed shaft, said housing comprising a central hollow body and heads connected with opposite ends of said body, and said body being provided with an internal bracket on which the opposing ends of the high and low speed shafts are rotatably mounted in axial alignment and the end heads being provided with bearings in which said high and low speed shafts are respectively journalled, said body being provided at its ends with circular seats, and each of said intermediate shafts having one end of large circular form and engaging a seat on one end of the body, while its other end is of reduced circular form and engages with the companion seat at the opposite end of the body and forms an outwardly facing shoulder engaging the inner side of the last mentioned seat and means for sealing the joint between the large end of each intermediate shaft and the respective seat.

12. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the low speed shaft, said housing comprising a central hollow body and heads connected with opposite ends of said body, and said body being provided with an internal bracket on which the opposing ends of the high and low speed shafts are rotatably mounted in axial alignment and the end heads being provided with bearings in which said high and low speed shafts are respectively journalled said body being provided at its ends with circular seats, and each of said intermediate shafts having one end of large circular form and engaging a seat on one end of the body, while its other end is of reduced circular form and engages with the companion seat at the opposite end of the body and forms an outwardly facing shoulder engaging the inner side of the last mentioned seat and means for sealing the joint between the large end of each intermediate shaft and the respective seat comprising a washer engaging the outer end of each seat at the large end of each intermediate shaft, a screw connecting said washer with the respective shaft, and a packing interposed between said washer and seat.

13. A speed changer comprising a housing, a high speed shaft journalled in said housing, a low speed shaft journalled in said housing, two intermediate shafts mounted on said housing, a small gear wheel mounted on the high speed shaft, a large gear wheel mounted on the low speed shaft, two pairs of gear wheels mounted on one of said intermediate shafts and each pair being connected and consisting of a small gear wheel and a large gear wheel, the large gear wheel of one pair meshing with the small gear wheel of the high speed shaft and the small gear wheel of the other pair meshing with the large gear wheel of the low speed shaft, and one pair of connected gear wheels mounted on the other intermediate shaft, the large gear wheel of the last mentioned pair meshing with the small gear wheel of the pair geared to the high speed shaft and the small gear wheel of the one pair meshing with the large gear wheel of the pair geared to the low speed shaft, said body provided on its top with a detachable cap the division line between the body and cap being above said intermediate shafts.

HARRY J. SMITH.